(12) United States Patent
Killeen et al.

(10) Patent No.: US 11,362,600 B2
(45) Date of Patent: Jun. 14, 2022

(54) ELECTROSTATIC MOTOR HAVING UNIPOLAR DRIVE

(71) Applicant: Wisconsin Alumni Research Foundation, Madison, WI (US)

(72) Inventors: Peter Killeen, Madison, WI (US); Daniel Colin Ludois, Middleton, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 168 days.

(21) Appl. No.: 16/811,288

(22) Filed: Mar. 6, 2020

(65) Prior Publication Data

US 2021/0281194 A1  Sep. 9, 2021

(51) Int. Cl.
*H02N 1/00* (2006.01)
(52) U.S. Cl.
CPC ............. *H02N 1/004* (2013.01); *H02N 1/002* (2013.01)
(58) Field of Classification Search
CPC ........... H02N 2/14; H02N 1/147; H02N 1/004
USPC ........................................................ 310/309
See application file for complete search history.

(56) References Cited

U.S. PATENT DOCUMENTS

| 2,232,143 | A | * | 2/1941 | Schweitzer, Jr. | ...... | H02N 1/004 310/308 |
| 3,629,624 | A | * | 12/1971 | Staudte | ................... | H02N 1/004 310/309 |
| 4,736,286 | A | * | 4/1988 | Gulczynski | .............. | H02M 1/44 363/15 |
| 5,920,474 | A | * | 7/1999 | Johnson | ................... | H02M 7/10 363/126 |
| 9,960,719 | B1 | * | 5/2018 | Ghule | ..................... | H02N 1/004 |
| 2005/0180175 | A1 | * | 8/2005 | Torrey | ................... | H02M 3/335 363/17 |
| 2013/0043762 | A1 | * | 2/2013 | Ludois | ................. | H02K 13/003 310/219 |
| 2013/0106317 | A1 | | 5/2013 | Ludois | | |
| 2016/0028328 | A1 | | 1/2016 | Ludois | | |
| 2016/0099663 | A1 | * | 4/2016 | Petrowsky | ............. | H02N 1/004 310/300 |
| 2016/0211775 | A1 | | 7/2016 | Ge et al. | | |
| 2016/0344306 | A1 | | 11/2016 | Ge et al. | | |
| 2017/0338750 | A1 | | 11/2017 | Ge et al. | | |
| 2018/0026552 | A1 | * | 1/2018 | Nagata | ..................... | H02N 1/08 310/309 |
| 2019/0036449 | A1 | | 1/2019 | Venkataramanan et al. | | |
| 2019/0296659 | A1 | | 9/2019 | Reitz et al. | | |

(Continued)

FOREIGN PATENT DOCUMENTS

JP   2009284612   * 12/2009   ............... H02N 1/00

OTHER PUBLICATIONS https://www.diodes.com/assets/Datasheets/ZVN3310A.pdf Mar. 1994 (Year: 1994).*

(Continued)

*Primary Examiner* — Burton S Mullins
(74) *Attorney, Agent, or Firm* — Boyle Fredrickson, S.C.

(57) ABSTRACT

A generator/controller for electrostatic motors exploits properties of a delta-connected electrostatic motor to accommodate high common mode DC offset voltages thus permitting construction of an electrostatic drive circuit outputting unipolar sinusoidal power and having a substantial reduction in the complexity and size.

18 Claims, 4 Drawing Sheets

(56) References Cited

U.S. PATENT DOCUMENTS

2019/0379288 A1\* 12/2019 Chaput ................ H01L 41/042
2020/0036299 A1   1/2020 Ludois et al.

OTHER PUBLICATIONS

T. C. Neugebauer, D. J. Perreault, J. H. Lang and C. Livermore, "A six-phase multilevel inverter for MEMS electrostatic induction micromotors," in IEEE Transactions on Circuits and Systems II: Express Briefs, vol. 51, No. 2, pp. 49-56, Feb. 2004, doi: 10.1109/TCSII.2003.822419. (Year: 2004).\*
M. Krishnamurthy, A. Jindal and B. Fahimi, "Operational characteristics of variable capacitance micromotor drives: a preliminary investigation," IEEE International Conference on Electric Machines and Drives, 2005., 2005, pp. 1116-1121, doi: 10.1109/IEMDC.2005.195861. (Year: 2005).\*
P. L. Chapman, "Efficiency issues in variable-capacitance micromotor drives," IEEE International Conference on Electric Machines and Drives, 2005., 2005, pp. 1122-1129, doi: 10.1109/IEMDC.2005.195862. (Year: 2005).\*
English machine translation of Sashita JP 2009-284612, Dec. 2009. (Year: 2009).\*
International Search Report for PCT/US2021/018251 dated Jun. 9, 2021.

\* cited by examiner

ELECTROSTATIC MOTOR HAVING UNIPOLAR DRIVE

STATEMENT REGARDING FEDERALLY SPONSORED RESEARCH OR DEVELOPMENT

--

CROSS REFERENCE TO RELATED APPLICATION

--

BACKGROUND OF THE INVENTION

The present invention relates to electrostatic motors of a type suitable for position and hold applications and in particular to an electrostatic motor having improved drive electronics.

Electrostatic motors operate by exploiting forces generated by electrical fields on a respective stator and rotor, for example, as established on opposed plates on the stator and rotor. Electrostatic motors may be distinguished from conventional electromagnetic motors which exploit forces generated by interacting magnetic fields generated by the stator and rotor, for example, generated by current-carrying electrical coils or a permanent magnet.

Unlike electromagnetic motors, electrostatic motors require high-voltage electrical power from a driving circuit. A driving circuit may provide multiple stages including a first stage providing a conventional DC power supply receiving AC power (for example, line voltage) and rectifying and filtering this AC power to produce a source of DC power (low-voltage DC bus). Power from the DC bus is then "stepped up" at a second stage to the desired high voltage by a DC/DC converter having a first set of transistors synthesizing an AC waveform that is received by a step-up transformer. The output of the step-up transformer is rectified and filtered to create a high-voltage DC bus. This high voltage is then fed to a third stage, typically in the form of an "H-bridge" of switching transistors which switch the high-voltage DC to synthesize the desired high-voltage sinusoidal power that is ultimately received by the plates of the electrostatic motor.

Electrostatic motors can offer an important advantage over conventional electromagnetic motors with respect to "step and hold" applications where the motor spends a substantial amount of time holding the rotor in a fixed position against external torques. Holding a fixed position with a conventional electromagnetic motor can consume substantial electrical power dissipated in the resistance of the motor windings. In contrast, an electrostatic motor in a stall condition presents a very high resistive load, greatly reducing power consumption in a hold state.

This advantage suggests that electrostatic motors could have widespread use as actuators in robotics and the like where they can move an axis of the robot into position and then hold the axes in position with low power consumption. Unfortunately, the high voltage, complexity, and cost of the driving circuits needed for such electrostatic motors presents an obstacle to widespread adoption.

SUMMARY OF THE INVENTION

The present invention greatly simplifies the driving circuitry needed for electrostatic motors, facilitating the use of electrostatic motors for step and hold applications in robotics and the like. The drive circuitry is simplified by exploiting the understanding that an electrostatic motor is largely indifferent to DC offsets in the AC power driving the motor. This allows the power generator supplier to be "unipolar," operating with an output voltage between zero and a predetermined drive voltage rather than between a negative and positive drive voltage. This greatly simplifies the control of the switching semiconductors used for synthesizing the AC power, eliminating floating or isolated gate circuits. In one embodiment, the use of a bidirectional flyback voltage converter further simplifies design by eliminating semiconductor switches and allowing some semiconductor switches to operate at lower voltages. In one embodiment, the simplified driving circuitry can be incorporated into the motor which may then be wired into a larger system using familiar low-voltage wiring.

More specifically, in one embodiment, the invention provides an electrostatic actuator having an electrostatic motor providing a stator with multiple stator electrodes adapted to receive multiple phases of electrostatic power to generate a moving stator electric field vector about an axis and a rotor having multiple rotor electrodes providing a rotor electric field interacting with the moving stator electric field primarily by electrostatic forces rather than magnetic forces. The electrostatic motor is connected to an electrostatic drive having a set of phase circuits having power input terminals providing a ground conductor and a power conductor, the phase circuits providing solid-state switching devices for synthesizing the phases using power from the power input. A control circuit receives a control signal and controls the solid-state switching devices according to the control signal. The phase circuits each provide phases of alternating current having a single polarity with respect to the ground conductor.

It is thus a feature of at least one embodiment of the invention to greatly simplify the high-voltage driving circuitry needed for electrostatic motors by exploiting the ability of electrostatic motors to accommodate common-mode DC voltages thereby allowing use of unipolar electrostatic drive output.

The control circuit may provide on and off control signal voltages to the solid-state switching devices referenced to the ground conductor. In one embodiment, the switching devices are three terminal devices providing a control terminal controlling the flow of current between the remaining terminals, one of which provides a direct current path to the ground conductor.

It is thus a feature of at least one embodiment of the invention to permit the switching devices to be controlled with ground-referenced signals eliminating the need for level shifting or isolation circuitry required of a standard H bridge.

The power received at the power input terminals may have a voltage less than the voltage of the phases. In one example, the voltage across the ground conductor and power conductor of the power input terminals may have a voltage less than the voltage of the phases with respect to the ground conductor. More specifically, the voltage of the phases with respect to the ground conductor may be greater than 500 volts.

It is thus a feature of at least one embodiment of the invention to provide an electrostatic drive circuit that provides voltage step-up capabilities.

The solid-state switching devices may include silicon carbide transistors having a breakdown voltage of at least 100 V and a current rating of greater than one ampere.

It is thus a feature of at least one embodiment of the invention to provide an electrostatic drive suitable for use with commercially available switching devices.

The phase circuits may provide a direct current path from at least one switching semiconductor to an electrode of least one of the stator and rotor of the electrostatic motor.

It is thus a feature of at least one embodiment of the invention to provide an electrostatic drive that may provide direct drive of an electrostatic motor.

The electrostatic actuator motor system may further include a housing holding the electrostatic motor and the electrostatic drive and provide mounts for attaching the housing to structure of a device to be mechanically driven by the actuator, the housing providing externally accessible conductors for receiving the power input and control signal and electrical insulation for preventing electrical conduction between structures outside of the housing and the phases.

It is thus a feature of at least one embodiment of the invention to provide a high-voltage electrostatic motor that may be readily integrated into environments with low-voltage wiring.

The phase circuits may be flyback converters providing energy storage and voltage step-up using coupled inductors. In one embodiment each phase circuit may connect the power input terminals across a series connection of an electrostatic drive, a first inductor of a coupled inductor, and a first solid-state switching device; and the phase circuit may provide a connection of the phase to the ground conductor through a series connection of a second inductor of the set of coupled inductors and a second solid-state switching device.

It is thus a feature of at least one embodiment of the invention to provide a circuit topology that eliminates a significant number of the solid-state switching elements needed for an H bridge.

The first switching devices may provide a maximum breakdown voltage of less than a maximum breakdown voltage of the second switching devices.

It is thus a feature of at least one embodiment of the invention to employ a topology that permits control of power passing forward through the generator/controller using low-voltage transistors to significantly reduce costs.

Each phase may provide an identical DC offset voltage.

It is thus a feature of at least one embodiment of the invention to minimize torque ripple caused by unbalanced common mode voltage.

The phase circuits may be bidirectional to receive power at the phases and to communicate power to the power input and to receive power from the power input and communicate power to the phases.

It is thus a feature of at least one embodiment of the invention to permit regeneration in the electrostatic drive.

The electrostatic motor provides multiple stator electrostatic drives connected in a delta configuration for the receipt of multiphase power.

It is thus a feature of at least one embodiment of the invention provide a motor suited for unipolar voltage use.

These particular objects and advantages may apply to only some embodiments falling within the claims and thus do not define the scope of the invention.

DETAILED DESCRIPTION OF THE PREFERRED EMBODIMENT

Figure 1:
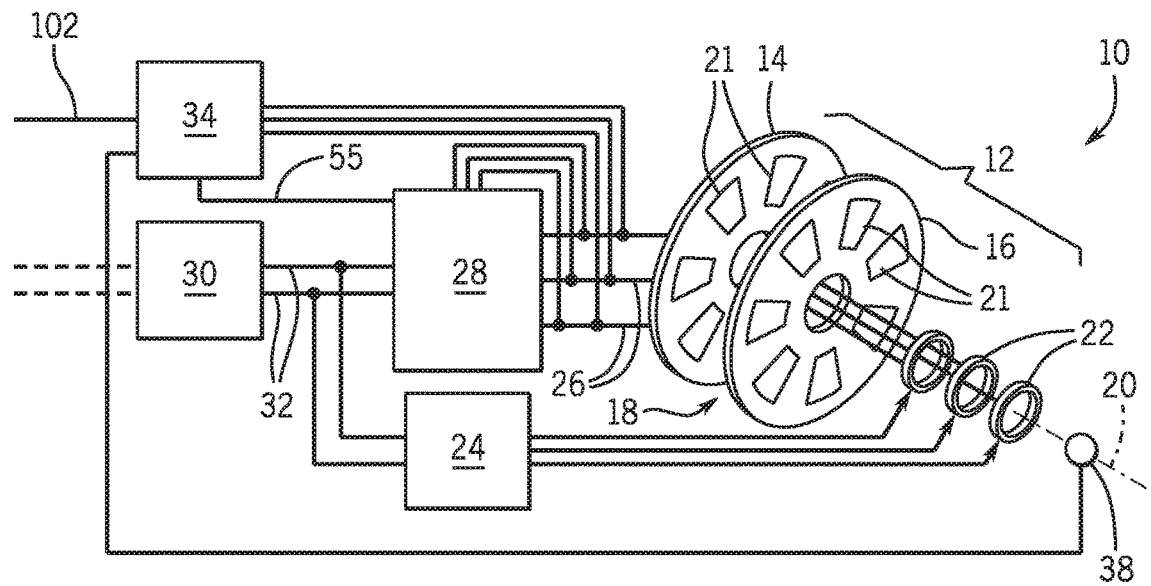
FIG. 1 is a simplified exploded diagram of an electrostatic actuator according to the present invention providing an electrostatic motor with stator and rotor plates and an electrostatic drive providing three phases of electrical power to the stator.

Referring now to FIG. 1, an electrostatic actuator 10 of the present invention may provide an electrostatic motor 12 having a stator 14 and rotor 16 positioned in opposition across a gap 18. The rotor 16 may be mounted to rotate on bearings or the like (not shown) about an axis 20 with respect to the stator 14.

Each of the rotor 16 and stator 14 may provide a set of plates 21 facing each other across the gap 18 that can move into and out of alignment as the rotor 16 rotates. Electrical power may be provided to the plates 21 of the rotor 16 through slip rings 22 from a DC rotor drive circuit 24 which provides two terminals to establish the polarity of the roller plates and a third terminal for a midpoint voltage. Ideally, the midpoint voltage will match the common mode voltage described below. Electrical power may be provided to the plates 21 of the stator 14 as phases 26 from an electrostatic drive 28. The phases 26 connect to the plates 21 on the stator 14 to create a rotating electrostatic field interacting with the electrostatic fields on the rotor 16 to provide torque rotating the rotor 16 with respect to the stator 14. The phases 26 may also provide DC signals to lock the rotor 16 with respect to the stator 14.

Electrostatic motors 12 suitable for use with the present invention are also described in the following US patent applications: U.S. Pat. No. 10,243,485 entitled: "Peg-style electrostatic rotating machine employing dielectric sleeves"; U.S. Pat. No. 9,899,937 entitled: "Peg-style electrostatic rotating machine"; U.S. Pat. No. 9,866,148 entitled: "Electrostatic machine system and method of operation"; U.S. Pat. No. 9,571,010 entitled: "Varying capacitance rotating electrical machine"; U.S. Pat. No. 9,479,085 entitled "Self-conforming plates for capacitive machines such as electrostatic motors and generators; and U.S. Pat. No. 9,184,676 entitled: "Varying capacitance rotating electrical machine." Each of these patents is assigned to the assignee of the present invention and hereby incorporated by reference in its entirety.

The electrostatic drive 28 and rotor drive circuit 24 may receive power from a power line 32 communicating with a standard low-voltage DC power supply 30 (e.g., from less than 100 volts to 1000 volts).

The electrostatic motor 12 and electrostatic drive 28 may form part of a motor control system providing a feedback controller 34 providing a command signal 55 to the electrostatic drive 28 using voltage and current feedback from the phases 26 of the electrostatic drive 28 as well as position or velocity feedback signals from sensors 38 or the like as will be discussed further below.

Figure 2:
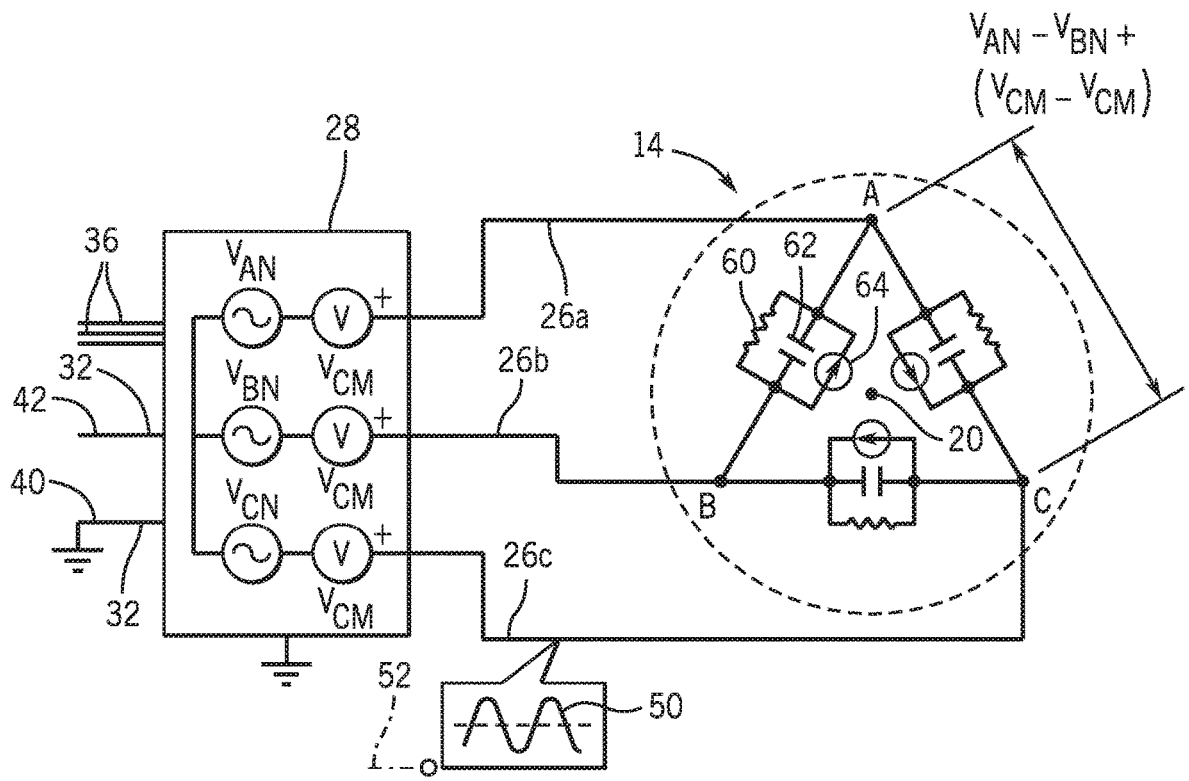
FIG. 2 is a simplified block diagram of the electrostatic motor and electrostatic drive of FIG. 1 showing the generation of unipolar phases by the drive circuit and the delta configuration of the electrical motor.
Figure 3:
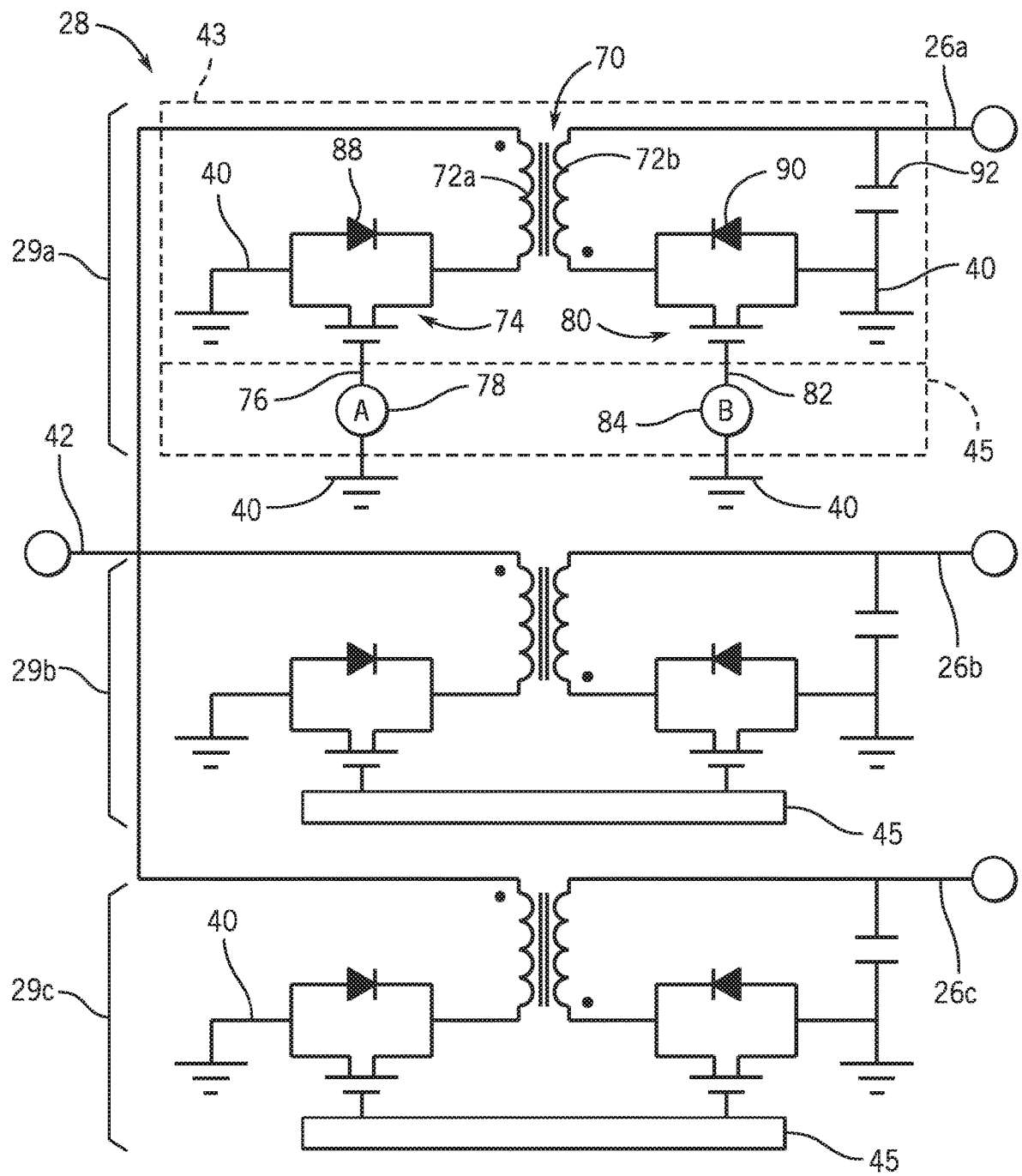
FIG. 3 is a schematic diagram of the electrostatic drive of FIGS. 1 and 2 showing phase circuits for creating phases for the electrostatic motor using coupled inductors to provide for flyback step-up.

Referring now to FIG. 2, the power line 32 received by the electrostatic drive 28, for example, may have a ground conductor 40 and power conductor 42 and may provide for multiple phase circuits 29a-29c each providing a switching circuit 43 and timing circuit 45 and operating to receive power from the power conductor 42 and synthesize three phases 26a, 26b, and 26c provided to the stator 14.

The present invention provides that each of the phases 26 may be unipolar, that is providing a varying voltage level of waveform 50 that remains above a ground-reference value 52 at all times. It will be appreciated that a unipolar drive may likewise provide a varying level of waveform 50 that always remains below a ground-reference value 52.

The unipolar phases 26 produced by the electrostatic drive 28 from each phase circuit 29 may be represented by a series-connected bipolar sinusoidal signal (denoted for the respective phase circuits 29 as $V_{AN}$, $V_{BN}$, and $V_{CN}$ in FIG. 2) and respective common mode DC voltage signal $V_{CM}$. The common mode DC voltage signal $V_{CM}$ is preferably equal for each phase circuit 29 and has a value equal to or greater than the amplitude of the bipolar sinusoidal signals $V_{AN}$, $V_{BN}$, and $V_{CN}$ thus operating to convert the bipolar signals into unipolar signals. Generally, each of the bipolar bipolar sinusoidal signals $V_{AN}$, $V_{BN}$, and $V_{CN}$ will have a relative phase difference of 120 degrees (and be thus equally separated in phase). It will be appreciated that the present invention may be extended to multiple additional phases (for example, more than three) as may be desired for a particular motor 12 through the addition of additional phase circuits 29.

Generally, in the three-phase case, each phase 26 will connect to a different plate 21 so that every third plate is associated with a given phase 26 thus creating a set of generally rotating electrostatic field vectors rotating with respect to the stator 14 equal in number to the total number of plates divided by three. The DC voltages from rotor drive circuit 24 may likewise be connected in a similar pattern of every other to provide corresponding vectors fixed with respect to the rotor 16.

Referring still to FIG. 2, while this common mode voltage $V_{CM}$ would be a significant source of lost power and magnetic saturation with the electromagnetic motor, the electrostatic motor 12 may be configured in a delta configuration in which the common mode voltage $V_{CM}$ cancels out. As shown, a delta configuration of the electrostatic motor 12 may be modeled as connections between plate sets A, B, and C (each set comprised of every third plate 21) that form a triangle. Each vertex of the triangle connects to adjacent vertices by a high resistance 60 (generally on the order of millions of ohms), an interplate capacitance 62, and current source 64 representing a back current produced by the electrostatic motor. Generally, "back current" is the equivalent to back EMF arising in an electromagnetic motor being a function of field voltage and rotor speed.

The effective voltage across each of the plate sets, and thus creating the electrostatic field between the plate sets A, B, and C, will be functions of the bipolar sinusoidal signal $V_{AN}$, $V_{BN}$, and $V_{CN}$ only because the common mode voltages $V_{CM}$ at each plate set will cancel. It will be appreciated that some variation in the common mode voltage $V_{CM}$ of each plate set can be accommodated without significant increase in power loss, however, with a slightly different charge on each interplate capacitance 62 such as would produce a torque ripple, that may or may not be acceptable.

Figure 4:
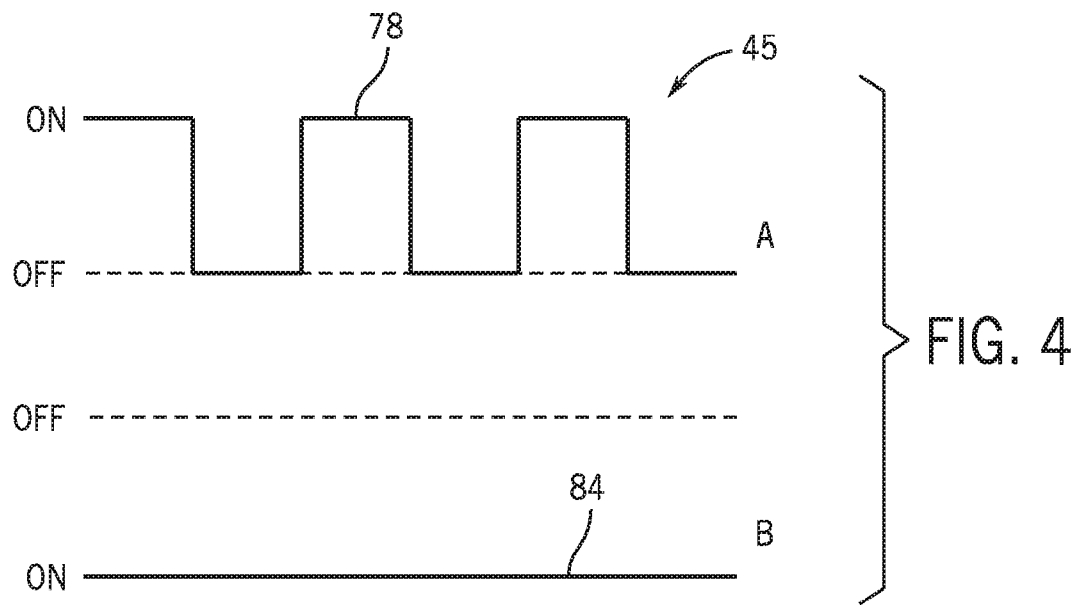
FIG. 4 is a switching pattern of the electrostatic drive for two semiconductor devices of one phase circuit showing ground referencing of the control signal during a driving of the motor.

Referring now to FIG. 4, the unipolar output of the phases 26 permits a greatly simplified circuit construction for the electrostatic drive 28. In one embodiment, identical phase circuit 29a-29c associated, respectively, with phases 26a-26e may employ a flyback voltage converter design. Referencing phase circuit 29a, a coupled inductor pair 70 provides a gapped inductor with a first inductor 72a coupled to a second inductor 72b so that substantial energy may be in stored in the inductance of the inductor pair 70 and a ferrite core. The power conductor 42 may connect to one side of inductor 72a and the other side of inductor 72a may connect through a first terminal (a drain) of switching transistor 74 (for example, a silicon carbide a MOS transistor) and then through the switching transistor 74 and out a second terminal (a source) of the switching transistor 74 to ground 40. This direct connection between one terminal of transistor 74 and ground 40 allows the gate 76 of switching transistor 74 to be driven by a gate signal 78 generated by the timing circuit 45 that is referenced to ground 40, meaning that the switching threshold of the transistor 74 remains constant with respect to ground 40. As a result, the switching signal 78 need not be isolated from the transistor 74, for example, by an optical coupler, transformer or the like, and does not require sophisticated level shifting.

The second inductor 72b of the coupled inductor pair 70 may have one side connected to the respective phase (26a) and the other side connected to a first terminal (drain) of transistor 80 (for example, a silicon carbide MOS transistor), and then through the transistor 80 and out of a second terminal (all a source) connected to ground 40. This direct connection between transistor 80 and ground 40 again allows the gate 82 of transistor 80 again to be driven by a gate signal 84 developed by timing circuit 45 referenced to ground 40 with the same benefits that were described above.

Generally, the power conductor 42 will be relatively low in voltage, for example, less than 100 volts, and accordingly transistor 74 may be a low-voltage transistor having a breakdown voltage between the drain and source of less than higher than the voltage on the power conductor 42 but much less than the breakdown voltage of transistor 80. The flyback effect of the inductor pair 70 will cause the transistor 80 to experience high voltages and accordingly transistor 80 must be a high-voltage transistor having a higher breakdown voltage, for example, of over a thousand volts. This represents a benefit over a standard H-bridge design where each transistor of the H bridge must be a high-voltage transistor.

Each of the transistors 74 and 80 may be shunted by a flyback diode 88 and 90, respectively, having their cathodes connected directly to respective inductors 72a and 72b and their anodes connected to ground.

Referring now to FIG. 4, in a non-regenerative mode of operation, when power is being transferred from the power line 32 to the phases 26, switching signals 78 and 84 may be developed by the timing circuit 45 for each phase circuit 29 to provide a switching of the respective transistors 74 and 80 as indicated. Specifically, transistor 74 will be switched on and off (between conducting a nonconducting states, respectively), and transistor 80 will be switched on. During the conduction portions of each cycle of switching, current will be drawn through inductor 72a by transistor 74 storing energy in the inductance of inductor pair 70. The diode 90 blocks discharge of the capacitor 92 from any flow through inductor 72b out of the capacitor 92 at this time. When transistor 74 is turned off, a flyback effect occurs in which the rapidly collapsing magnetic field of the inductor pair 70 generates a high-voltage in the inductor 72b serving to charge a capacitor 92 connected between ground 40 and a phase 26 to a value substantially above ground 40 and higher than the line voltage of power conductor 42. By controlling the frequency of the switching of signal 78 with the timing circuit 45, the voltage on capacitor 92 may be controlled for any given load. The switching frequency may be many times faster than the frequency of the desired waveform 50 (for example, 50 kilohertz for a waveform 50 having a frequency of less than 1000 hertz) to allow accurate synthesis of the necessary sinusoidal waveform 50. Generally, the turns ratio between the inductors 72a and 72b may be set to determine the peak voltage that can be achieved in the capacitor 92 for a given switching speed.

The above-described process may be flipped during regeneration when power is transferred from the phases 26 to the line voltage of power conductor 42. In this case, transistor 80 is switched on and off to provide the necessary extraction of energy from the capacitor 92. This energy passes backward through the coupled inductors 70 (and is stepped-down) to be received at power conductor 42 and filtered by the implicit capacitance of the power supply 30.

Figure 5:
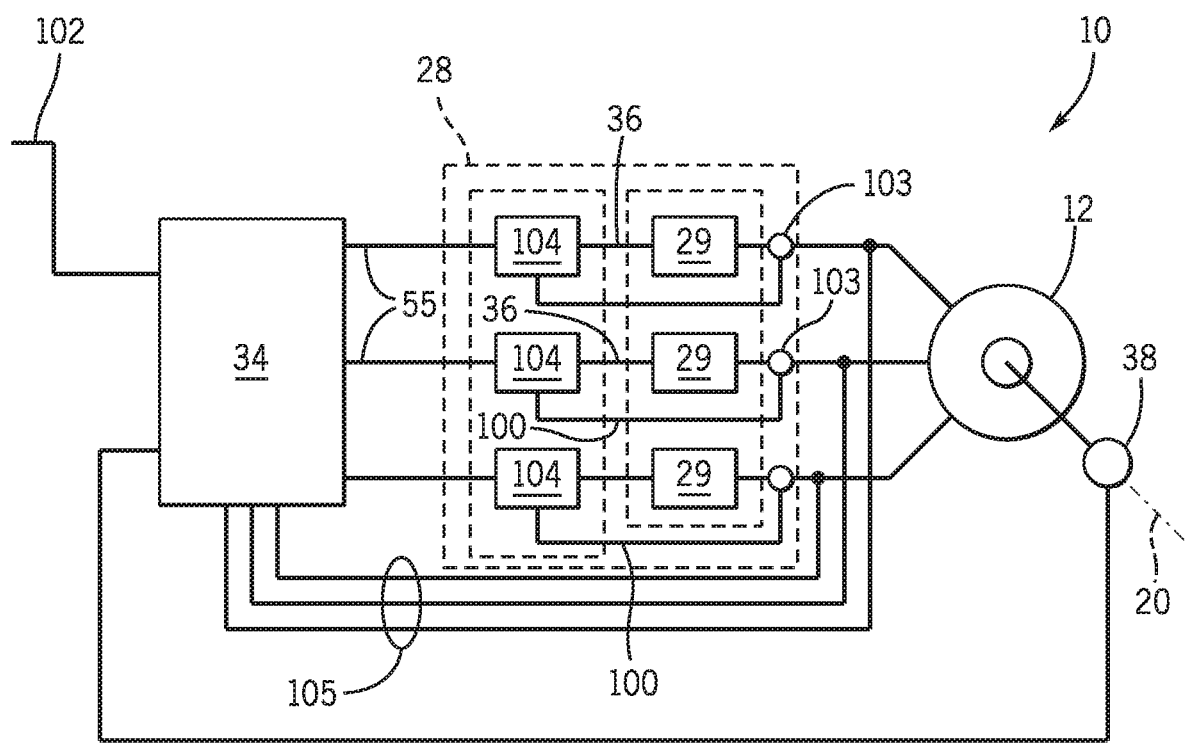
FIG. 5 is a block diagram showing the incorporation of the electrostatic drive of FIGS. 1-3 into a motor control system for feedback control.

Referring now to FIG. 5, feedback control may be used to generate the necessary command signals 36 for the timing circuit 45. For example, a first feedback loop 100 may be employed associated with each phase circuit 29 measuring the output current of the phase, for example, using a current sensor 103 and providing that current measurement to a peak current mode controller 104, for example, as described in R. Erickson and D. Maksimovic, "Fundamentals of Power Electronics," in Fundamentals of Power Electronics, 2001, pp. 439-488 hereby incorporated by reference.

The peak current controller 104 and electrostatic drive 28 may be in turn part of a larger feedback loop provided by the feedback controller 34 receiving voltage signals 105 from each phase 26 to implement standard motor control techniques, for example, as discussed in U.S. Pat. No. 9,979,323 cited above, according to a control input 102 received by the feedback controller 34 such as position velocity, etc. The common mode voltage is preferably but not necessarily maintained at a constant DC value by means of feed forward or feedback control and coordinated with the midpoint of the rotor.

Figure 6:
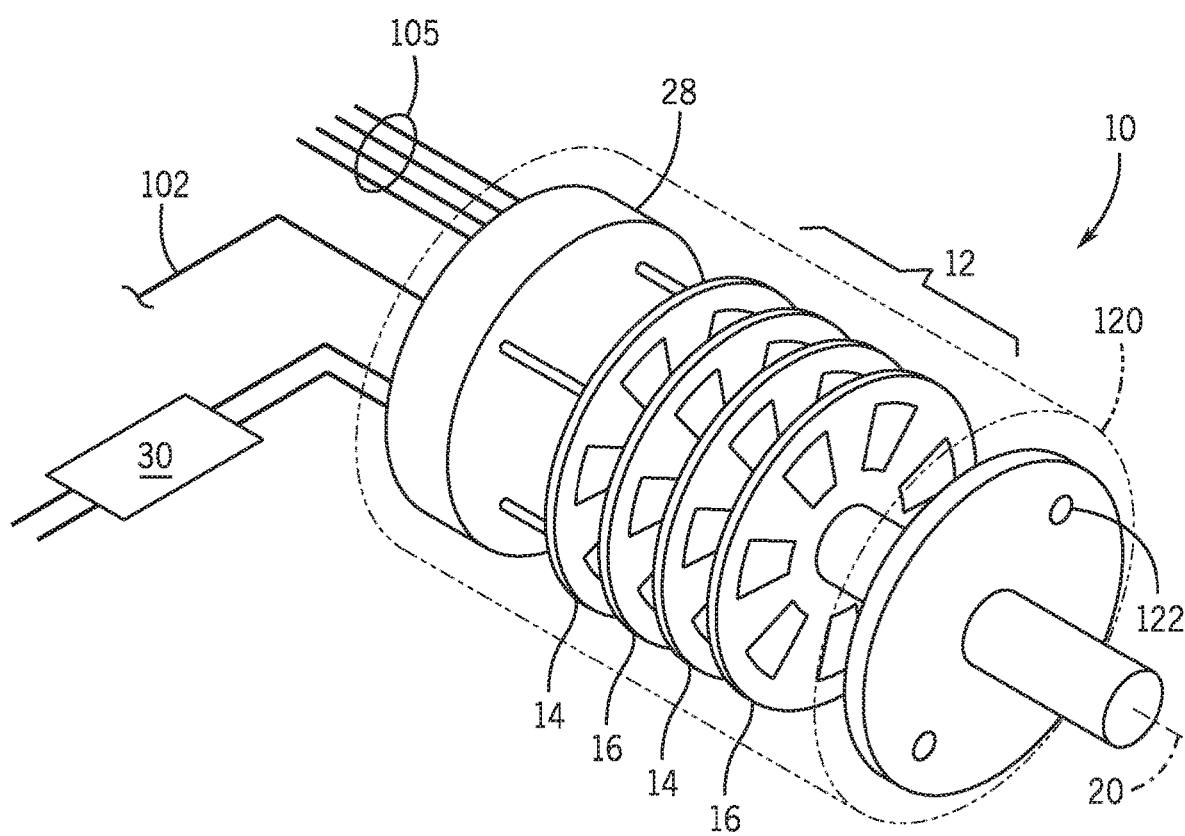
FIG. 6 is a simplified phantom view of an actuator system providing an insulating housing incorporating high-voltage components of the electrostatic drive to permit simple integration of the actuator into low-voltage systems.

Referring now to FIG. 6, by eliminating the larger number of transistors necessary for an H-bridge as well as the circuitry to couple the transistor drives required in an H-bridge as well as being able to use a less bulky: coupled inductor 70, the electrostatic drive 28 may be practically incorporated into a housing 120 of the actuator 10. The housing 120 provides an electrically insulating barrier within a Faraday cage of conductive material shielding the internal high voltages associated with electrostatic motor 12 from contact with outside structures or individuals and provides convenient mounting points 122. The housing 120 may provide for terminals allowing the passage of low-voltage signals into and out of an insulating barrier of the housing 120 including a low-voltage power line 32, a control input 102, and isolated voltage signals all having a low voltage of less than 100 volts. In this way the actuator 10 may be incorporated into low-voltage architectures, for example, robotics and the like, where power and signals are distributed at safer low voltages.

As used herein, the phrase "direct current path" refers to a path that can support indefinitely the flow of DC current and thus a path through an inductor but not through a capacitor, transformer or the like. "Ground-referenced" refers to a signal, for example, controlling a switching device, that can be stably defined with respect to a ground potential to control the switching device independent, for example, of other voltage levels of an associated circuit.

While the above description describes a rotary motor, it will be appreciated that the same design can be readily adapted to linear motors where the stator and rotor are "unrolled" to provide linear rather than rotary motion. As used herein, "rotor" will refer both to the rotor in a rotating machine and the stationary part of the linear motor also called the secondary while "stator" will refer both to the stator in a rotating machine and the movable part of a linear motor also called the primary.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties To aid the Patent Office and any readers of any patent issued on this application in interpreting the claims appended hereto, applicants wish to note that they do not intend any of the appended claims or claim elements to invoke 35 U.S.C. 112(f) winless the words "means for" or "step for" are explicitly used in the particular claim. What does direct-current path mean.

What we claim is:

1. An electrostatic actuator system comprising:
   an electrostatic motor providing a stator with multiple stator electrodes adapted to receive multiple phases of electrostatic power to generate a moving stator electric field vector about an axis and a rotor having multiple rotor electrodes providing a rotor electric field interacting with the moving stator electric field primarily by electrostatic forces rather than magnetic forces; and an electrostatic drive communicating with the electrostatic motor and providing:

a set of phase circuits having power input terminals providing a ground conductor and a power conductor, the phase circuits providing:
(1) solid-state switching devices for synthesizing the phases using power from the power input;
(2) a control circuit receiving a control signal and controlling the solid-state switching devices according to the control signal;
wherein the phase circuits each provide phases of alternating current having a single polarity with respect to the ground conductor;
wherein each phase circuit connects the power input terminals across a series connection of a first inductor of a coupled inductor and a first solid-state switching device; and wherein the phase circuit provides a connection of the phase to the ground conductor through a series connection of a second inductor of the set of coupled inductors and a second solid-state switching device; and
wherein the control circuit controls each of the solid-state switching devices to complete a switch cycle between successive switching on times at a frequency faster than a frequency of a respective phase allowing synthesis of a varying voltage of the respective phase.

2. The electrostatic actuator system of claim 1 wherein the control circuit provides on and off control signal voltages to the solid-state switching devices referenced to the ground conductor.

3. The electrostatic actuator system of claim 2 wherein the switching devices are three-terminal devices providing a control terminal controlling a flow of current between the remaining terminals and wherein one of the remaining terminals provides a direct current path to the ground conductor.

4. The electrostatic actuator system of claim 1 wherein the power received at the power input terminals has a voltage less than a peak voltage of the phases.

5. The electrostatic actuator system of claim 1 wherein the voltage across the ground conductor and power conductor of the power input terminals has a voltage less than a peak voltage of the phases with respect to the ground conductor.

6. The electrostatic actuator system of claim 1 wherein the voltage of the phases with respect to the ground conductor is greater than 500 volts.

7. The electrostatic actuator system of claim 6 wherein the solid-state switching devices include silicon carbide transistors having a breakdown voltage of at least 100 V and a current rating of greater than one ampere.

8. The electrostatic actuator system of claim 1 wherein the multiple rotor electrodes and multiple stator electrodes had have a same non-zero average voltage.

9. The electrostatic actuator system of claim 1 further including a housing holding the electrostatic motor and electrostatic drive and providing mounts for attaching the housing to structure of a device to be mechanically driven by the actuator, the housing providing externally accessible conductors for receiving the power input and control signal, and electrical insulation for preventing electrical conduction between structures outside of the housing and the phases.

10. The electrostatic actuator system of claim 1 wherein the phase circuits are flyback converters providing energy storage and voltage step-up using coupled inductors.

11. The electrostatic actuator system of claim 1 wherein the first and second solid-state switching devices each provide three terminals one of which is connected to the ground conductor to be at ground potential and each include a flyback diode.

12. The electrostatic actuator system of claim 1 wherein the first switching device provides a maximum breakdown voltage of less than a maximum breakdown voltage of the second switching device.

13. The electrostatic actuator system of claim 1 wherein each phase provides an identical DC offset voltage.

14. The electrostatic actuator system of claim 1 wherein the phase circuits are bidirectional to receive power at the phases and to communicate power to the power input and to receive power from the power input and communicate power to the phases.

15. The electrostatic actuator system of claim 1 wherein the electrostatic motor provides multiple stator electrodes connected in a delta configuration for the receipt of multiphase power.

16. The electrostatic actuator system of claim 1 wherein the phases are sinusoidal.

17. The electrostatic actuator system of claim 1 further including a feedback controller receiving voltage signals from each phase.

18. The electrostatic actuator system of claim 1 wherein the control circuit controls each of the solid-state switching devices to switch at a frequency least 50 times as fast as a frequency of a respective phase allowing synthesis of a varying voltage of the respective phase.

* * * * *